United States Patent [19]

Taylor

[11] Patent Number: 5,653,567
[45] Date of Patent: Aug. 5, 1997

[54] MOBILE CATTLE FEEDER

[75] Inventor: Charley A. Taylor, Rte. 3, Box 95, Olney, Tex. 76374

[73] Assignee: Charley A. Taylor, Jermyn, Tex.

[21] Appl. No.: 540,541

[22] Filed: Oct. 6, 1995

[51] Int. Cl.[6] .................................................. B60P 1/36
[52] U.S. Cl. ...................... 414/519; 239/676; 414/528; 414/327; 414/502; 414/434; 222/626; 222/622; 222/620; 222/505
[58] Field of Search ..................... 414/439, 437, 414/434, 414, 403, 528, 327, 326, 325, 527, 539, 501, 502, 328, 491; 198/300, 301, 310; 239/672, 676, 678; 222/626, 613, 623, 624, 185.1, 415, 622, 504, 505, 620, 508, 618

[56] References Cited

U.S. PATENT DOCUMENTS

| | | | |
|---|---|---|---|
| 219,911 | 9/1879 | Clark et al. | |
| 2,221,266 | 11/1940 | Roach | 275/6 |
| 2,946,597 | 7/1960 | Simonsen | 275/8 |
| 3,550,866 | 12/1970 | Swenson | 414/528 X |
| 3,811,602 | 5/1974 | Holland | 222/178 |
| 4,044,921 | 8/1977 | Caverly | 222/74 |
| 4,060,111 | 11/1977 | Burks | 141/231 |
| 4,068,769 | 1/1978 | Sweet et al. | 414/528 X |
| 4,157,150 | 6/1979 | Hetrick | 414/502 X |

FOREIGN PATENT DOCUMENTS

| | | | |
|---|---|---|---|
| 2408535 | 7/1979 | France | 414/528 |
| 2534887 | 4/1984 | France | 414/528 |
| 1226961 | 3/1971 | United Kingdom | 414/528 |

*Primary Examiner*—Frank E. Werner
*Attorney, Agent, or Firm*—Dougherty, Hessin, Beavers & Gilbert

[57] ABSTRACT

A mobile batch feeder for cubed feed consisting of a supply hopper with conveyor leading to a cumulative dispensing chute. Rotational input to drive the conveyor also functions to trip open the dispensing chute periodically thereby to dispense measured batches of cube feed.

7 Claims, 3 Drawing Sheets

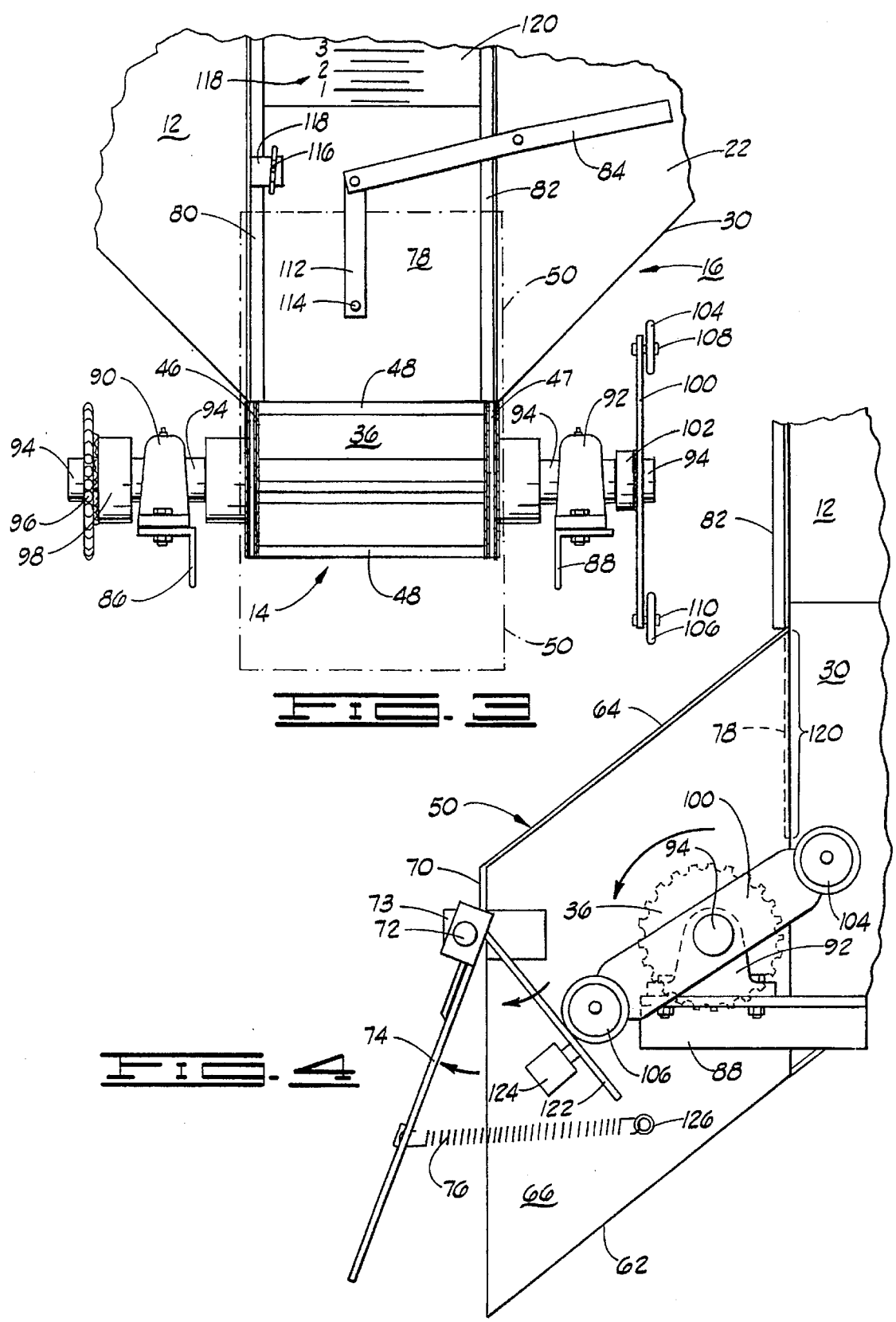

MOBILE CATTLE FEEDER

BACKGROUND OF THE INVENTION

1. Field of the Invention

The invention relates generally to mobile cattle feeders and, more particularly, but not by way of limitation, it relates to an improved cattle feeder that meters feed cubes for distribution in piles of predetermined weight and spacing.

2. Description of the Prior Art

The prior art includes various types of animal feeders that dispense feed from a moving bin. U.S. Pat. No. 219,911 provides an early disclosure of a bin for containing bulk material for dissemination by means of an integral conveyor assembly leading outboard from the bin. U.S. Pat. No. 2,221,266 describes a material spreader that includes a conveyor belt in the base of the storage body whereupon the belt feeds material to a lateral conveyor screw to spread the fungible material laterally across the path of the spreader. U.S. Pat. No. 2,946,597 is of interest as it describes a device for dispensing fertilizer by means of an endless conveyor. The device actually has a series of storage bins with separate release gates at the bottom rear of each bin. This enables mixing of two or more different materials during the spreading process as actual spreading of the material is carried out by lateral broadcast. Many other spreading and dispensing types of equipment have been utilized in the past but the inventor is not aware of any feed dispensing device that is capable of batch output of cube feed in predetermined weight allotments and distribution spacing.

SUMMARY OF THE INVENTION

The present invention teaches a mobile feeding apparatus that is particularly desirable for range feeding of animals such as cattle, horses or the like which consists of a mobile bin for containing cube feed that is continually carried rearward by a conveyor mechanism to a release point. The cube feed carried by the conveyor is then deposited in a dispenser chute which is tripped open periodically. The prime power may be supplied either by a twelve volt gear motor or by ground-contacting wheels to drive the conveyor and the dispensing mechanism at a predetermined rate whereby the dispensing hopper collects feed for a predetermined time before dropping the feed in a pile. The dropping of cube piles is carried on as the feed bin is moved across a pasture or range area and an adjustable feed gate limits the amount of cube supplied from the conveyor into the feed hopper which, in turn, is controlled as to the rate of opening to dispense the batches of cube feed.

Therefore, it is an object of the present invention to provide a cube feed dispenser that provides accurate metering of feed.

It is also an object of the invention to provide a cube feed dispenser that periodically drops feed in piles of predetermined size and spacing.

It is still further an object of the present invention to provide a feed dispenser that is easily adjustable as to the dispensing output.

Finally, it is an object of the present invention to provide a batch feeding mechanism that may be adaptable to any size mobile unit utilizing whatever the required primary power input.

Other objects and advantages of the invention will be evident from the following detailed description when read in conjunction with the accompanying drawings that illustrate the invention.

BRIEF DESCRIPTION OF THE DRAWINGS

FIG. 3 is an end view of the dispensing portion of the bulk feeder;

FIG. 4 is a side view in elevation with parts shown in phantom of the dispensing mechanism of FIG. 3;

DETAILED DESCRIPTION OF THE INVENTION

Figure 1:
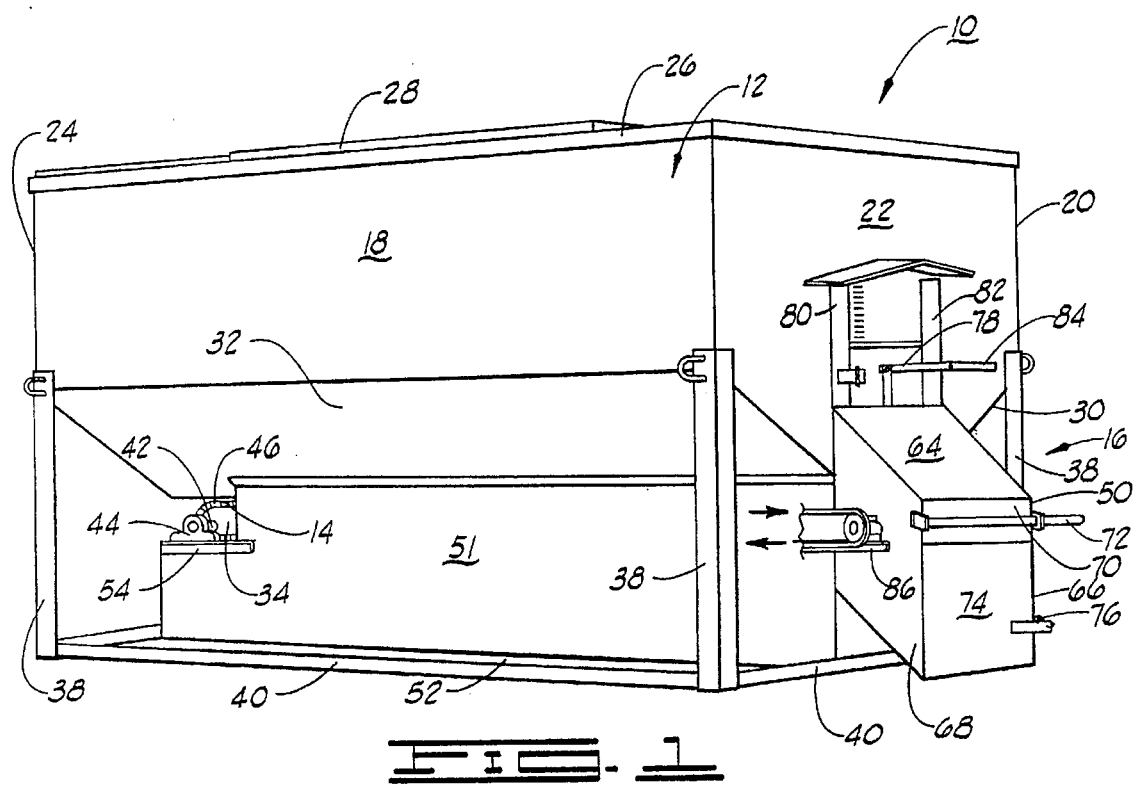
FIG. 1 is a perspective view of a bulk cattle feeder constructed in accordance with the invention.
Figure 2:
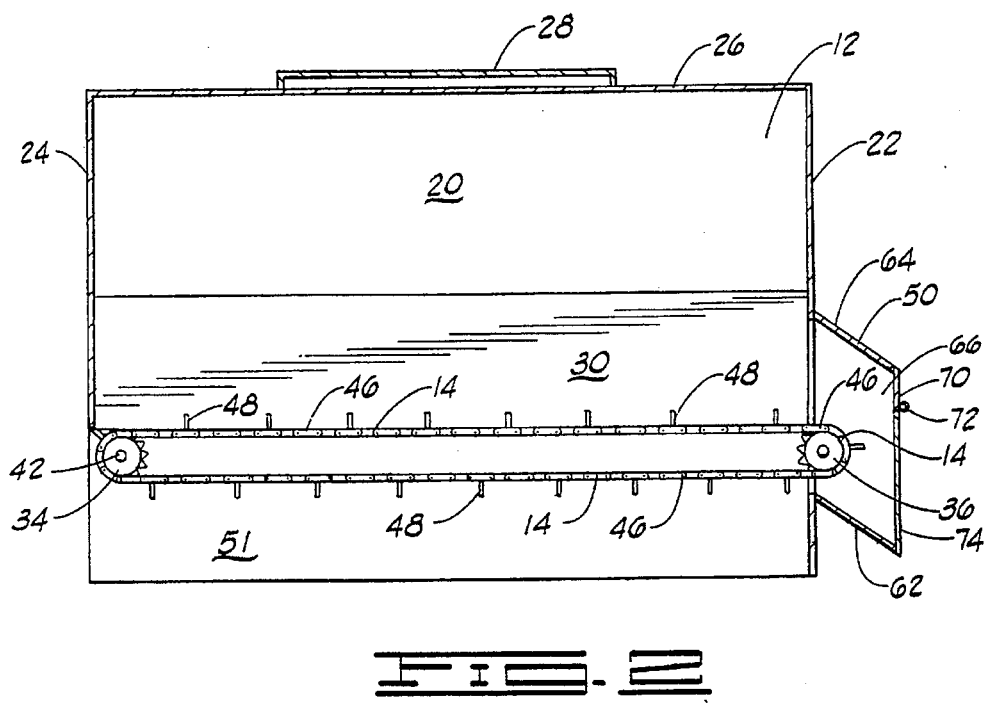
FIG. 2 is a vertical section taken along the longitudinal center of the bin and conveyor.

Referring to FIGS. 1 and 2, a bulk feeder 10 includes a hopper 12, a conveyor 14 and a dispenser 16. The hopper 12 consists of opposite side walls 18 and 20 and front and rear end walls 22 and 24 with a top cover 26 that includes a sliding entry door 28. Opposite side slant walls 30 and 32 provide the lower side walls as they slant down toward the central axis at an angle of about 45°. The slant walls 30 and 32 terminate at their lower end closely adjacent the conveyor 14 which traverses through the longitudinal central portion of hopper 12 as driven on opposite end sprocket drums 34 and 36. See FIG. 2. A support frame consisting of four corner angle irons 38 secured on a rectangular frame 40 supports the hopper 12 in balanced manner.

The sprocket drum 34 is supported on a shaft 42 that is rotationally supported between opposite side pillow blocks 44. The front end sprocket drum 36 is rotationally supported in similar manner, as will be further described below. Thus, the conveyor 14 is a wide, double chain conveyor (to be further described) that runs the length of the feed bin as conveyor 14 rotates around sprocket drums 34 and 36. Referring also to FIG. 3, a plurality of paddles 48 are disposed laterally across the conveyor chains 46 and 47 at approximately six inch spacing. The conveyor 14 continually moves feed cubes forward for deposit in the dispensing chute 50, as will be further described below.

The lower portion of conveyor 14 is housed within opposite side panels 51 which form an elongate formation secured beneath opposite side slant panels 32 and 30 dropping vertically downward to a floor plate 52 secured within the rectangular frame 40. The opposite side elongate panels 51 also provide foundation for a transverse platform 54 which supports the opposite side bearing blocks 44 which hold the rotational sprocket drum 34 that functions as an idler for the dual sprocket chains 46 and 47 (see also FIG. 3). The front side panel 22 of hopper 12 includes the dispenser chute 50 which extends centrally forward to house the release area of sprocket drum 36 and conveyor 14. The dispenser chute 50 consists of a bottom chute plate 62 and parallel chute top panel 64 with opposite side chute panels 66 and 68 terminating at a vertical panel 70. The lower portion of vertical panels 70 includes a hinge rod 72 and support brackets 73, and door panel 74 is normally closed as biased by a spring 76 (see also FIG. 4). Referring again to FIG. 1, a vertical slide gate 78 sliding within slide guides 80 and 82 under control of lever 84 provides adjustment of the amount of opening between the bin 12 and the interior of chute 50 to vary the amount of cube feed delivered per unit time, as will be described.

Referring to FIG. 3, the interior workings of dispenser 16 are illustrated as the dispensing chute 50 structure is shown only in phantom. Thus, a pair of angle braces 86 and 88 are suitably mounted adjacent the forward end of conveyor 14. For example, the angle braces 86 and 88 may be mounted on the respective opposite side chute panels 68 and 66 at a position immediately forward of conveyor 14. The opposite side pillow block bearings 90 and 92 are securely mounted on the angle braces 86 and 88 to support a rotational drive shaft 94 which extends through the sprocket drum 36 in interlocked manner thereby to supply drive to the conveyor 14. Thus, the sprocket drum 36 is rotated to drive each conveyor chain 46 and 47 and the paddle members 48. One end of drive shaft 94 has a twenty-four tooth sprocket 96 and collar 98 secured thereon to transfer rotational movement from a primary power source to the drive shaft 94 and sprocket drum 36. The primary power source may consist of either a D/C motor and gear reducer or a rotational input derived from a ground-contacting wheel, as will be further described.

The opposite side of the drive shaft 94 is rigidly connected to a rotor blade 100 mounted on a collar 102 that rotates in synchronism with the drive gear 96 and the sprocket drum 36 that advances the conveyor 14. The opposite ends of the rotor blade 100 include snubber wheels 104 and 106 mounted on respective rotor pins 108 and 110, and snubber wheels 104 and 106 function to periodically open the door panel 74 from dispenser 16, as will be further described.

The vertical slide gate 78 is controlled by lever 84 via the pivotal link 112 connected to pivot post 114. Manipulation of lever 84 causes raising or lowering of slide gate 78 whereupon the slide gate 78 may be locked in position by a manual thumb screw 116. Graduations 118 marked on upper bin portion 120 allow the operator to identify the degree of opening of slide gate 78 to allow a designated amount of cube feed to be conveyed into the dispenser chute 50. The graduations 118 coordinate with the rate of revolution of drive shaft 94 so that graduations 118 will indicate the weight of feed cubes deposited with each opening of the door panel 74 (FIG. 4).

As shown in FIG. 4, a bracket 120 illustrates the maximum opening possible between hopper 12 and dispenser chute 50, and the slide gate 78 is vertically adjustable to set the amount of opening between hopper 12 and dispenser chute 50. The chute door panel 74 is normally urged closed by tension spring 76; however, with each half revolution of drive shaft 94 one of the snubber wheels 104 or 106 on rotor blade 100 will contact actuating lever 122 to momentarily open the door panel 74. The actuating lever 122 is rigidly secured to the hinge rod 72 of door panel 74 such that, when urged by rotor 100, it momentarily opens door panel 74 to release whatever the amount of accumulated feed cube from the dispenser chute 50. A counter 124 is actuated each time a snubber wheel 104 or 106 urges the actuating rod 122 downward, and counter 124 is electrically connected to the operator position to provide visual count output. When a snubber wheel 104, 106 rotates past the actuating position, the tension spring 76 anchored at post 126 pulls the door panel 74 to close the dispenser chute 50 for a next cube accumulation.

In operation, the operator first loads the number of required bags of cube feed into the hopper 12 and, thereafter, the operator adjusts the slide gate 78 by means of control lever 84 (FIG. 3). For example, if there are seventy-five head of cattle in the herd and the operator wants to feed three pounds per head, he adjusts the control lever 84 to the desired number of pounds of feed as indicated on graduations 118. Then, the designated number of pounds of cube feed will be dumped in each pile, as the mobile batch feeder 10 is moved around the pasture area to perform repeated dumps. Also, as the feeding procedure progresses, the counter 124 will transmit the number of dumps into the operator position, i.e., truck cab or the like, whereupon he can cease dumping operations after a predetermined number of dumps of known quantity. Thus, the operator has a very accurate account of feed output in the range area to provide a very efficient yet thorough feed operation.

Figure 5:
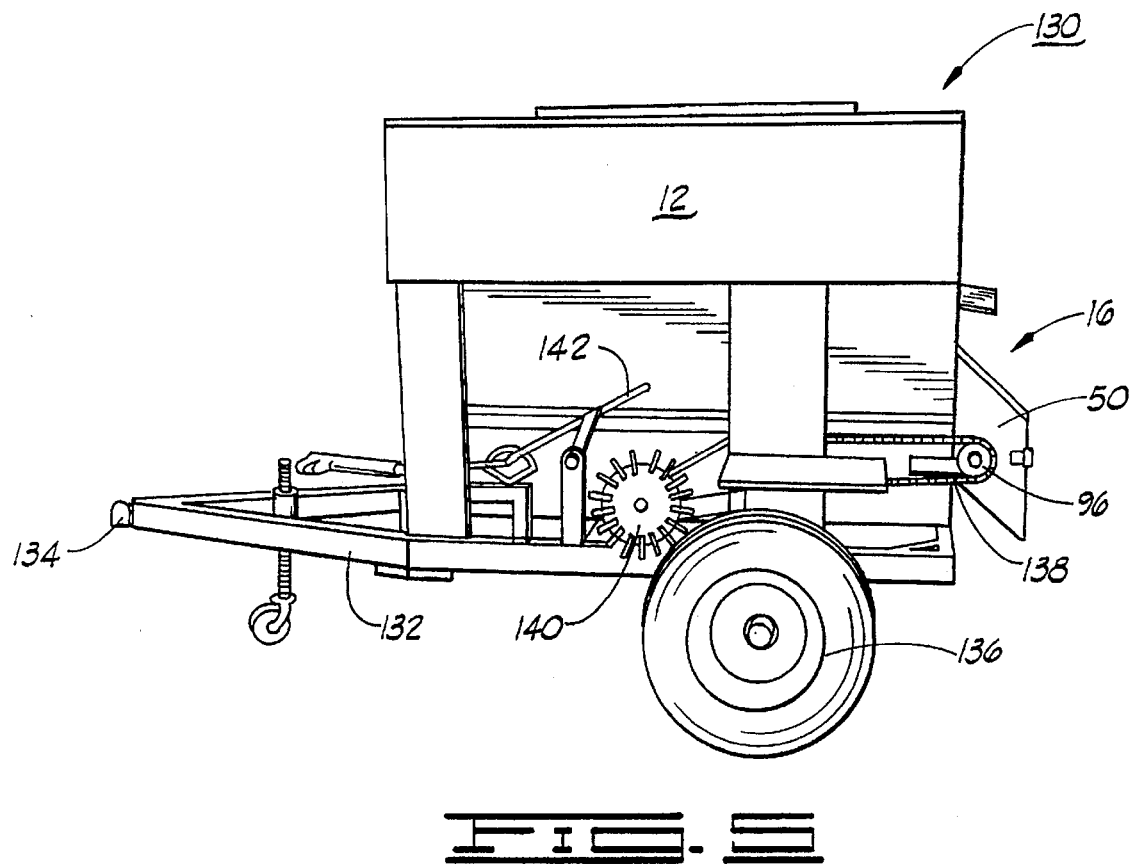
FIG. 5 is a bulk feed dispenser in side elevation as adapted for towing by a service vehicle.

The mobile batch feeder 10 may be employed in varying ways. FIG. 5 illustrates a trailer type of batch feeder 130 which includes a trailerable chassis 132, ball hitch 134 and ground-contacting wheels 136. The hopper 12 with dispenser chute 50 are then mounted on chassis frame 132 and primary power is supplied to drive sprocket 96 via drive chain 138 receiving input rotation from a cog wheel 140 that is selectively engaged against the ground wheel 136. A suitable control lever 142 controls engagement/disengagement of cog wheel 140 to transmit rotative power. In this case, the movement of the internal conveyor and the dump frequency of the dispenser chute 50 will be proportional to the ground speed of the ground wheels 136.

Figure 6:
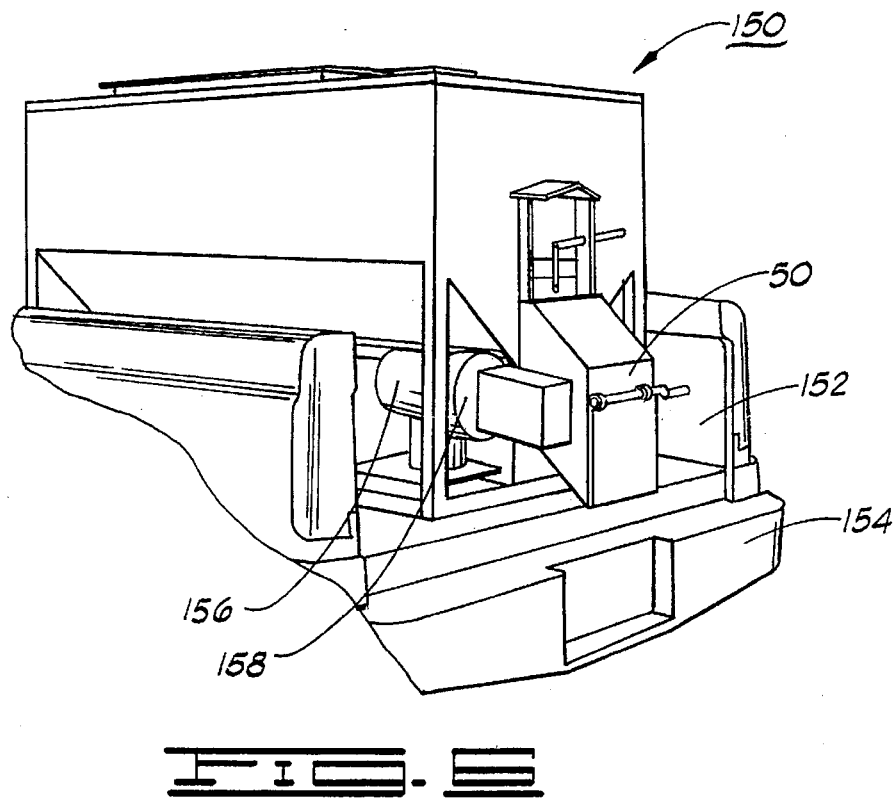
FIG. 6 is a perspective view of a bulk feed dispenser as it may be mounted in the bed of a pick-up truck.

FIG. 6 shows another alternative type of mounting. A mobile bulk feeder 150 may be mounted either permanently or on a slidable pallet in the rear end of a pick-up truck 152 so that hopper 12 is supported in the pick-up bed while the rearward dispensing chute 50 is disposed outboard over the rear bumper 154. In this case, the primary drive power is derived from a 12-volt D/C motor 156 operating through a gear reducer 158 to provide primary power input through chain guard 160 to the input drive sprocket 96 (not shown). The batch feeder 150 mounted in a pick-up may be situated variously in or over the bed of the pick-up truck. That is, it may also be mounted sideways to dispense from the side of the truck and this can be a valuable asset when it is desired to feed continuously into feed troughs in measured amounts.

The foregoing discloses a novel type of mobile batch feeder that enables feeding of cube feed in precise measured amounts. The device is particularly valuable in range feeding of a herd of known size wherein a designated number of feed piles may be deposited over spaced area while the number of piles and the weight per pile are accurately maintained. The feeding of herds under such precise distribution and amounts is beneficial to the cattle herd and it is also a benefit to the rancher due to the great economy and attendant savings in feed expenses.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A batch feeder for carriage on a mobile vehicle, comprising:

a hopper for containing cube feed, said hopper having a top panel with sliding entry door and sloping side walls which define a narrow longitudinal space;

a support frame for supporting said hopper on said vehicle;

first and second sprocket drums disposed rotatively at each end of said longitudinal space;

a conveyor chain disposed over said first and second sprocket drums to extend through said longitudinal space;

a dispensing chute disposed in communication with said hopper adjacent said conveyor chain;

a vertical slide gate adjustably disposed in said hopper over said second sprocket drum adjacent said dispensing chute to receive measured amounts of cube feed from said conveyor chain;

a normally closed horizontally hinged door panel in said dispensing chute to contain said cube feed therein during normally closed periods;

a source of rotational input; and means driven by said rotational input to drive said sprocket drums and conveyor chain to move cube feed into said dispensing chute while also periodically opening said door panel to dispense a measured batch of cube feed.

2. A batch feeder as set forth in claim 1 wherein said means driven comprises:

a drive sprocket connected to impart rotation to said second sprocket drum at a predetermined rate to move said conveyor chain toward said dispensing chute; and a rotor blade rotated in synchronism with said second sprocket drum to actuate said hinged door panel momentarily open on each half revolution of said rotor blade.

3. A batch feeder as set forth in claim 2 wherein said hopper further comprises:

a container having opposite upper side walls extending into said sloping side walls and opposite end walls completing the peripheral confinement.

4. A batch feeder as set forth in claim 1 wherein said hopper further comprises:

a container having opposite upper side walls extending into said sloping side walls and opposite end walls completing the peripheral confinement.

5. A batch feeder as set forth in claim 1 wherein said conveyor chain comprises:

first and second chain loops interconnected transversely by a plurality of spaced paddle members.

6. A batch feeder as set forth in claim 5 wherein said first and second sprocket drums each comprises:

first and second spaced sprockets each connected to drive one of said first and second chain loops.

7. A batch feeder as set forth in claim 6 wherein said means driven comprises:

a drive sprocket connected to impart rotation to said second sprocket drum at a predetermined rate to move said conveyor chain toward said dispensing chute; and a rotor blade rotated in synchronism with said second sprocket drum to actuate said hinged door panel momentarily open on each half revolution of said rotor blade.

\* \* \* \* \*